United States Patent [19]
Schreiber

[11] 4,080,634
[45] Mar. 21, 1978

[54] HALFTONE REPRODUCTION DEVICE WITH HIGH RESOLUTION SCANNING AND RECORDING SYSTEM

[75] Inventor: William F. Schreiber, Cambridge, Mass.

[73] Assignee: ECRM, Inc., Bedford, Mass.

[21] Appl. No.: 695,187

[22] Filed: Jun. 11, 1976

Related U.S. Application Data

[63] Continuation of Ser. No. 576,851, May 12, 1975, abandoned.

[51] Int. Cl.² ............... H04N 1/24; H04N 1/10; H04N 1/40; H04N 1/42
[52] U.S. Cl. .................................. 358/298; 358/286; 358/287; 358/302
[58] Field of Search ............ 178/6.7 R, 6.6 R, 6.6 A, 178/6.6 B, 7.6, 5, 6; 346/108, 76 L, 74 R, 74 FS; 358/296, 298, 297, 299, 300, 302, 283, 287, 286

[56] References Cited

U.S. PATENT DOCUMENTS

| | | | |
|---|---|---|---|
| 3,465,352 | 9/1969 | Carlson | 178/6.6 R |
| 3,541,245 | 11/1970 | Wilby | 178/6.7 R |
| 3,573,789 | 4/1971 | Sharp | 178/6.7 R |
| 3,573,849 | 4/1971 | Herriot | 178/6.7 R |
| 3,603,727 | 9/1971 | Kinugawa | 178/6.7 R |
| 3,613,103 | 10/1971 | Harris | 178/6.7 R |
| 3,646,262 | 2/1972 | Moe | 178/6.7 R |
| 3,657,472 | 4/1972 | Taudt et al. | 178/6.7 R |
| 3,783,185 | 1/1974 | Spaulding | 178/6.7 R |
| 3,916,096 | 10/1975 | Everett et al. | 178/6.7 R |
| 3,922,484 | 11/1975 | Keller | 178/6 |

OTHER PUBLICATIONS

Klensch et al., "Electronically Generated Halftone Pictures," RCA Review, Sept. 1970, pp. 517–533.

*Primary Examiner*—Raymond F. Cardillo, Jr.

[57] ABSTRACT

Improvements in apparatus for making a halftone reproduction of an original document, of the type having an optical system comprising a source of light and a deflecting member for providing deflecting scanning and recording beams, a drive for providing relative motion between the original document and the scanning beam in a direction transverse to the direction of deflection thereof so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced during that scanning cycle, video circuitry connected to the pickup for converting the electrical output into a video signal, a source of a succession of dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in the optical system responsive to the output circuitry and operative during a succession of recording cycles to modulate the recording beam in accordance with the halftone recording signals, and a drive for providing relative motion between photosensitive output stock and the modulated recording beam in a direction transverse to the direction of deflection thereof so that the recording beam will trace a succession of record lines across the output stock respectively during the succession of recording cycles to record black and white dots in the cells of the halftone screening pattern.

33 Claims, 18 Drawing Figures

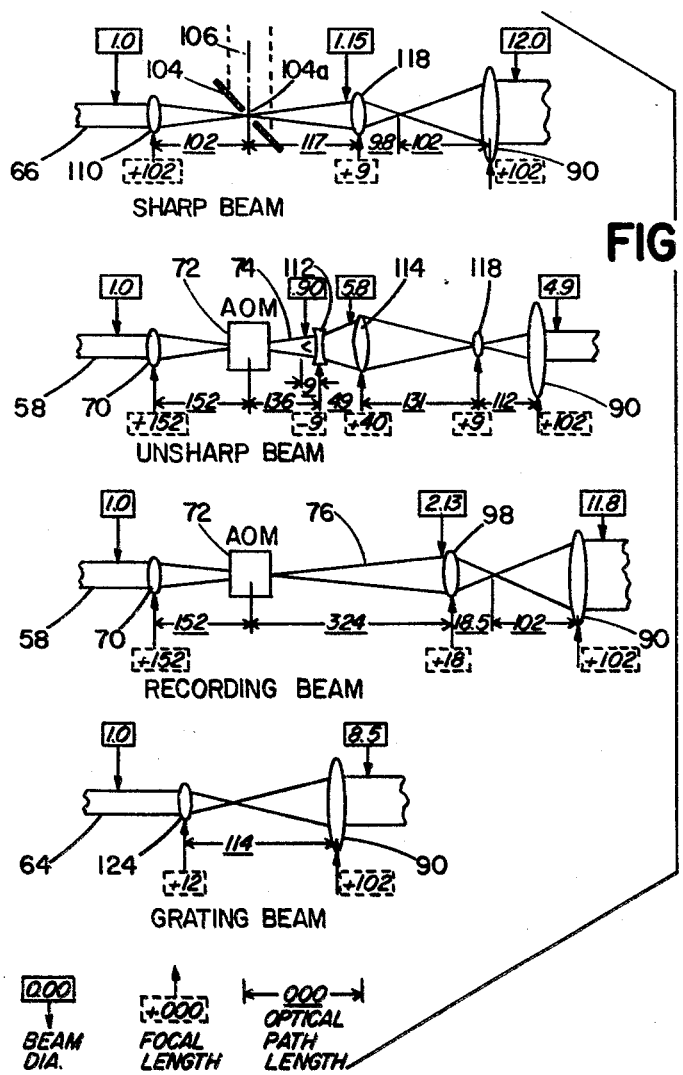
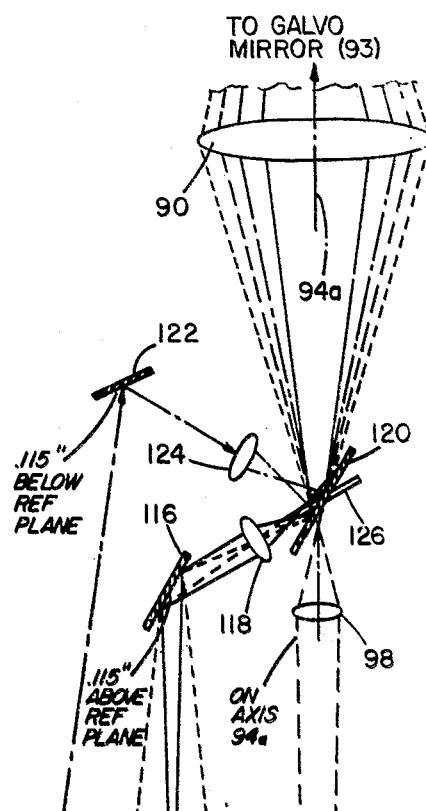
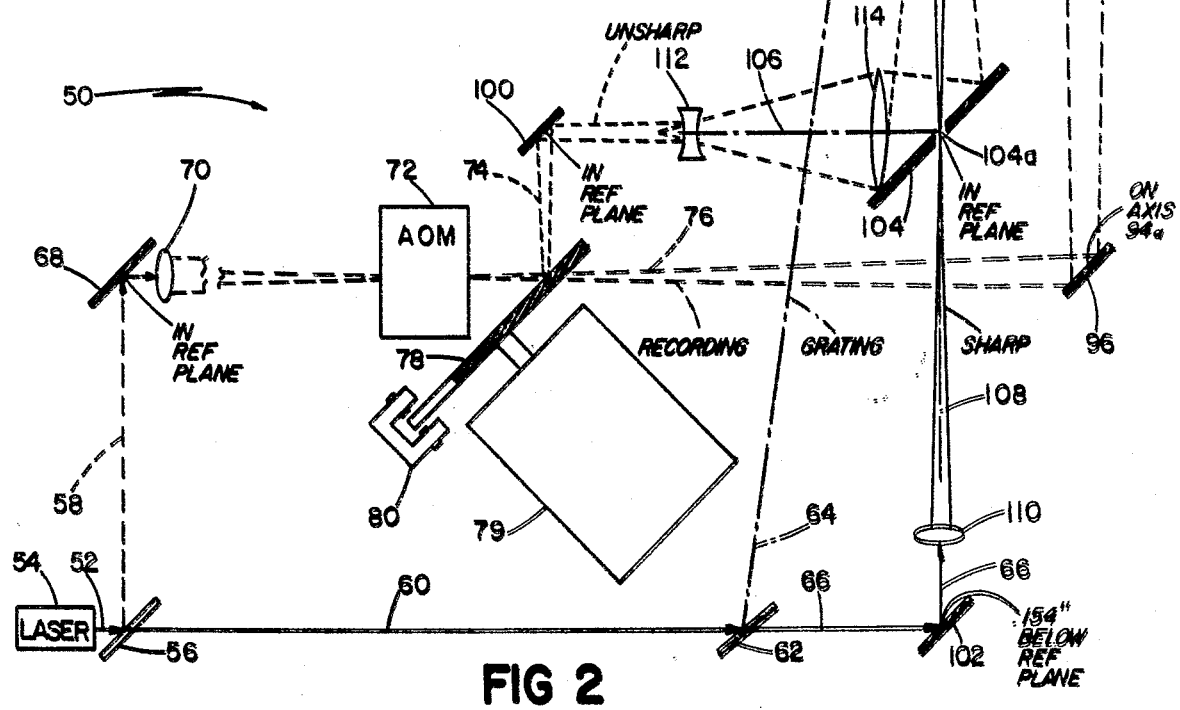
FIG 3
FIG 2

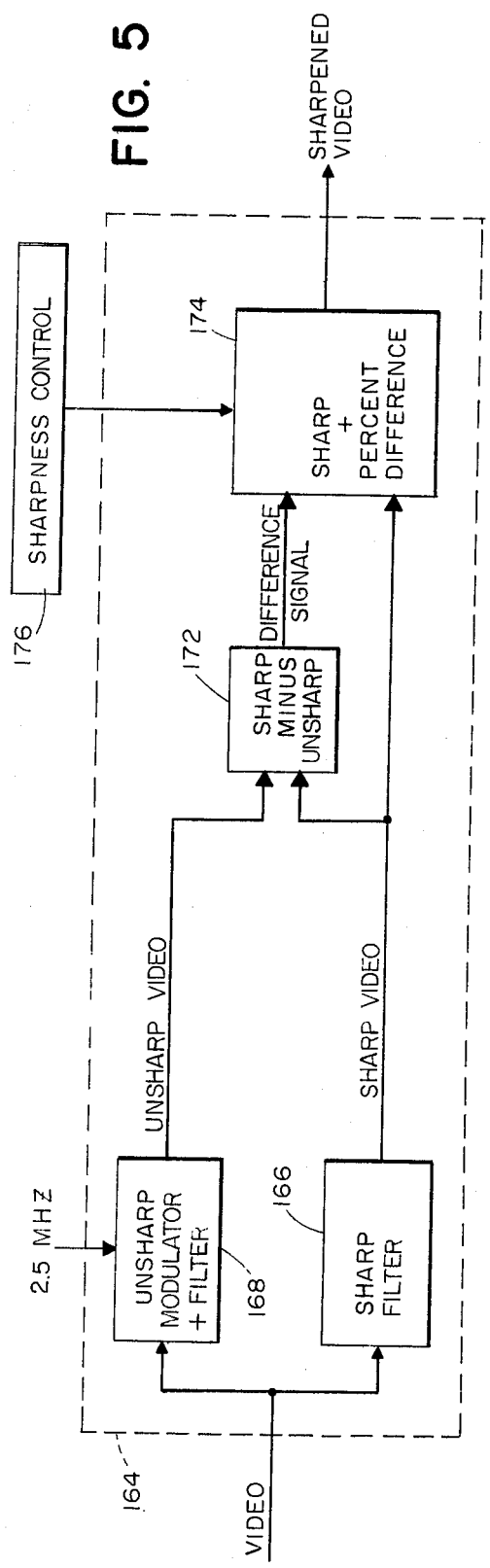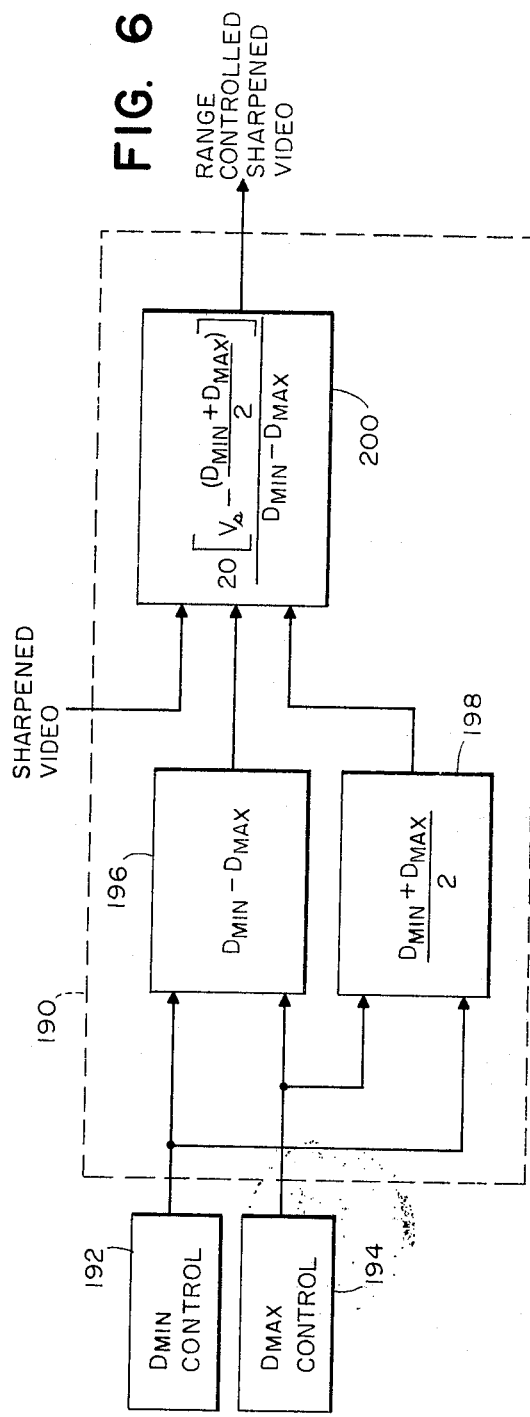

FIG 11
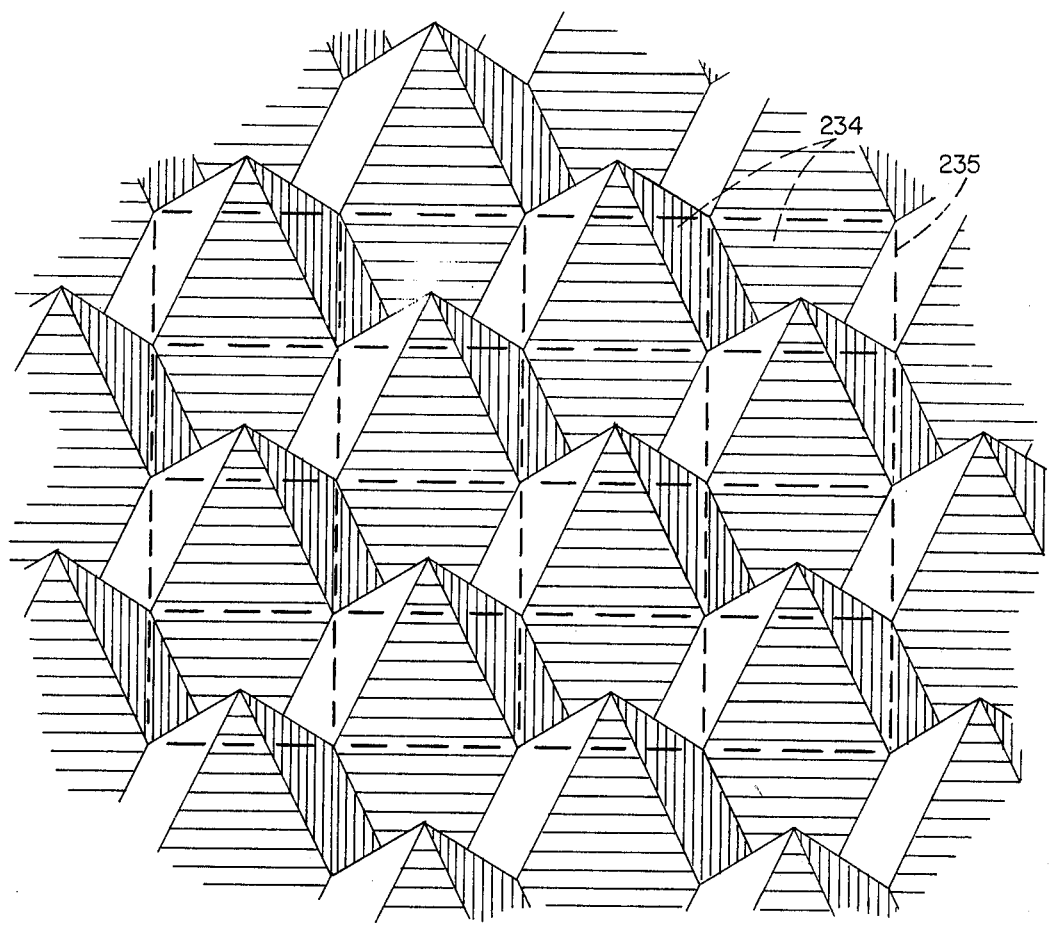
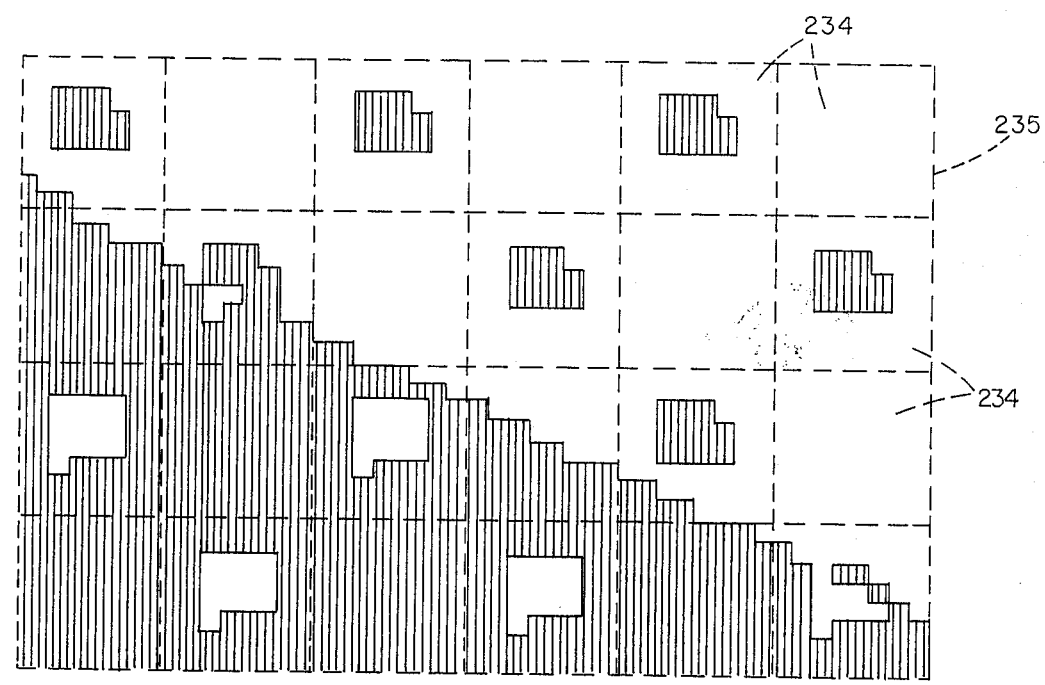
FIG 14a

FIG 12

| 13 | 29 | 25 | 5 | -11 | -35 | -39 | -3 |
|---|---|---|---|---|---|---|---|
| 41 | 57 | 59 | 17 | -23 | -51 | -53 | -47 |
| 45 | 63 | 61 | 21 | -19 | -49 | -55 | -43 |
| 1 | 37 | 33 | 9 | -7 | -27 | -31 | -15 |
| -13 | -29 | -25 | -5 | 11 | 35 | 39 | 3 |
| -41 | -57 | -59 | -17 | 23 | 51 | 53 | 47 |
| -45 | -63 | -61 | -21 | 19 | 49 | 55 | 43 |
| -1 | -37 | -33 | -9 | 7 | 27 | 31 | 15 |

270, 276, 272, 274

HALFTONE REPRODUCTION DEVICE WITH HIGH RESOLUTION SCANNING AND RECORDING SYSTEM

This is a continuation of application Ser. No. 576,851, filed May 12, 1975, now abandoned.

BACKGROUND OF THE INVENTION

This invention relates to making halftone copies of continuous tone documents.

In modern graphics processing it is desirable to substitute electro-optical systems for the process camera contact screening systems historically used to make halftones. One example of such an electro-otpical system is disclosed in Behane U.S. Pat. No. 3,604,846. In that system the original document is scanned to produce digital video signals each of which is scaled in accordance with the tone density in an incremental area of the original corresponding to a cell of the desired halftone screening pattern. The video signal is then used to control the number of marks made in each halftone cell, to create the effect of variable sized halftone dots. In Moe U.S. Pat. No. 3,646,262 the original document is similarly scanned at a resolution equal to the density of the desired screen to generate a video signal for each cell area, and a recording beam is shaped in accordance with the video to produce variable sized halftone dots. In Hennig U.S. Pat. No. 3,671,666 the desired halftone screening pattern and the original document are scanned smultaneously, at a resolution higher than that of the screen density, the video and screen signals are combined, and the halftone output is made black or white depending upon whether the combined signal is above or below a pre-set threshold value. By way of background the disclosures of the above patents are incorporated herein by reference.

SUMMARY OF THE INVENTION

The invention makes possible the use of any of a wide variety of halftone screening patterns, with relatively simple, inexpensive and easily operated apparatus. Reproduction is achieved with precisely controlled dot size and shape, yet at high speed, and the system is sensitive to tone changes even within the area of a cell of the screening pattern. Screened positive or negative prints of at least the quality (and higher) of those available using a conventional process camera and darkroom are provided, without the trouble and years of experience required for the latter. Tone density can be controlled independently at the end points and mid-region of the tone scale. Screen cell size is easily changed, and even multiple resolution screens can be employed. Automatic mode shift between line mode reproduction of line graphics and halftone reproduction of pictorial graphics is facilitated. Sophisticated control over magnification, margins, handedness, unsharp masking, and other aspects of the reproduction process is provided, at low cost and without the need for highly skilled operators. No plumbing or darkrooms are required.

In general, apparatus of the sort to which the present invention is applicable has the following features or their equivalents. An optical system is provided, including a source of light (preferably laser light) and a deflecting member (e.g., a galvonometer mirror) to produce a deflecting beam for scanning the original document and a recording beam for exposing photosensitive output paper. A document drive produces relative motion between the original document and the scanning beam in a direction transverse to the direction of beam deflection, so that the scanning beam will trace a succession of scan lines across the document respectively during a succession of scanning cycles. An electro-optical pickup (e.g., a photodiode strip) detects the light from the scanning beam after it has impinged upon the original document during each scanning cycle, to provide a varying electrical output representative of the tone density of the document along the scan line traced during that scanning cycle. Suitable circuitry connected to the pickup converts the electrical output into a video signal. The halftone screening is carried out by comparing the video with a succession of non-random dot reference signals representing the desired halftone screening pattern. Output circuitry generates halftone recording signals, each of which is based upon the result of comparing the video and reference signals corresponding to the particular cell of the screening pattern to be exposed by that recording signal. A modulator is provided in the optical system to modulate the recording beam during a succession of recording cycles (which may or may not occur simultaneously with the scanning cycles) in accordance with the halftone recording signals. A drive provides relative motion between the photosensitive output stock and the modulated recording beam in a direction transverse to that of beam deflection so that the recording beam will trace a succession of record lines across the output stock respectively during the succession of the recording cycles, to record black and white dots in the cells of the halftone screening pattern.

In one aspect the invention features timing circuitry for generating clock signals during the scanning and recording cycles at a clock rate sufficiently fast to provide a muliplicity of the clock signals during the time required for the recording beam to sweep across one cell of the screening pattern, arrangement o the output circuitry to compare successive video samples with the dot reference signals during the scanning cycles, at the clock rate, and to generate a black or white picture element recording signal for each comparison so as to provide to the modulator in each recording cycle, at the clock rate, a succession of the picture element recording signals for each cell swept by the recording beam, and arrangement of the deflecting member to deflect the recording beam along the record lines at a rate sufficiently high in relation to the rate of the output stock drive to produce a multiplicity of the record lines across each cell, whereby in each cell picture element recording signals are recorded on the output stock in sets arranged in multiple rows and columns, so that the size and configuration of the black and white dots are determined by the relative numbers and locations of the black and white picture element recording signals making up each dot. In another aspect the invention features range control circuitry for converting the electrical output from the pickup into an intermediate video signal covering a desired signal level range, and midtone control circuitry for adding to the intermediate video signal an enhancement signal which when graphed against the intermediate video forms a piecewise linear approximation of a parabola, whereby the video signal by comparison with the intermediate video signal has its midtone values selectively enhanced. In another aspect the invention features, in connection with phase lock loop circuitry arranged to generate the clock signals at a clock rate locked to the frequency of pulses produced by sweeping a light beam across a timing grating, a magnification selector for generating a magnification signal representative of the desired size relationship between the original document and the halftone reproduction, the magnification selector being connected to the phase lock loop to cause the clock rate during the recording cycles to be related by the value of the magnification signal to the clock rate during the scanning cycles. In another aspect the invention features, in connection with an optical system comprising first, second, and third lenses which respectively provide the recording beam and sharp and unsharp portions of the scanning beam, a deflecting mirror arranged to receive from the lenses and simultaneously deflect the light forming the recording, sharp scanning, and unsharp scanning beams, and unsharp masking circuitry for using information from the unsharp scanning beam to enhance image sharpness in the video signal, that improvement comprising a shutter assembly for diverting the output of the modulator to the third lens during the scanning cycles to modulate light forming the unsharp scanning beam, and circuitry connected to the modulator to produce modulation of the light passing therethrough at a constant frequency during the scanning cycles and in accordance with the dot recording signals during the recording cycles, the constant frequency modulation enabling separation by the video circuitry of sharp and unsharp components of the electrical output of the pickup respectively corresponding to the sharp and unsharp beams. In another aspect the invention features a special mirror arranged to combine the sharp and unsharp scanning beam portions in system having unsharp masking capability, that mirror being arranged at 45° to the perpendicular axes of the lenses through which the sharp and unsharp beam portions pass, the mirror having a non-reflective side facing the sharp beam portion lens, a transparent window to permit passage through the mirror of light forming te sharp beam portion, and a reflective side facing the unsharp beam portion lens to reflect light forming that beam portion to a path coaxial with the light forming the sharp beam portion. In another aspect the invention features, in connection with an optical system in which a single deflecting mirror simultaneously deflects light forming recording, sharp scanning, and unsharp beams, that improvement comprising a fourth lens or directing to the deflecting mirror light from the source forming a grating beam, a grating arranged in the path of the grating beam after its deflection by the mirror, an electro-optical grating pickup arranged to receive light from the grating beam after it impinges upon the grating to provide a train of grating pulses, and timing circuitry connected to the grating pickup to generate a train of clock pulses based upon the grating pulses, the output circuitry being connected to the timing circuitry to time comparisons of the video samples with the dot reference signals at the rate of the clock pulses during the scanning cycles and to time delivery of the recording signals to the modulator at the rate of the clock pulses during the recording cycles.

In preferred embodiments the dot reference signal source comprises a source of a succession of picture element (PEL) reference signals of different values, each dot reference signal comprising a group of the picture element reference signals. The picture element reference signal values can be chosen as desired to produce a desired screening pattern, and are preferably digital. A conventional screen can be provided by using for each dot reference signal, e.g., a matrix of 8 rows and 8 columns with 64 different values of PEL reference signals arranged with the higher values nearest the center and the lower values nearest the edges, and causing the output circuitry to compare successive video samples with successive signals in the matrix in an order such that the positions of the picture element recording signals in the rows and columns of the cell spatially correspond to the respective positions in the matrix of the reference signals which were compared with the video samples to produce the PEL recording signals. A multiple resolution screen can be provided by causing the dot reference signal to have multiple peaks of different magnitude so that for video levels above the second highest peak the screen has a cell size larger than that for video levels below the second highest peak. A single matrix of PEL reference signals can be stored in a digital memory and repeatedly retrieved or successive dot reference signals. Circuitry can be arranged to invert the polarity of the dot reference signal for adjacent cells in the rows and columns of the screening pattern. A single stored matrix can be used to create screens of different densities by using circuitry to limit the matrix signals used for each dot reference signal, thereby reducing the number of PEL reference signals constituting each dot reference signal to accommodate a corresponding decrease in the cell size of the screening pattern; a screen density selector is provided, as well as circuitry to adjust signal level range and baseline of the signals in any selected sub-matrix to the range and baseline of the signals in the full matrix, prior to comparison with the video.

In other preferred embodiments circuitry is provided to selectively convert the dot reference signals into a constant signal valued at the baseline of the video signal so that line graphics portions of the original document will produce constant black or white PEL recording signals, and a second electro-optical pickup is arranged to sense an increase in the scanning beam light specular reflected from the original document so that changes between halftone and line modes can be triggered by highly reflective tape placed on the original document.

In other preferred embodiments PEL recording signals are written into a storage buffer during the scanning cycles and read out to the modulator during the recording cycles. A position signal is generated, representative of the position of the scanning beam on the scan line during scanning cycles, adjustable top and bottom cursors generate margin signals representative of margins in the scan direction of the area on the original document to be reproduced, and cropping circuitry enables writing into the buffer only when the position signal is between the margin signals. Preferably, the cropping circuitry comprises circuitry for storing a value representative of the full width of the output stock in the direction of the record lines, for computing during each scanning cycle the total margin space available for the next record line on the output stock, and for distributing the margin space between the top and bottom margins on the output stock during each recording cycle. Signals can be read out of the buffer in either the same or opposite order in which they were written in, so that the handedness of the halftone reproduction can be selected.

Preferably the spatial frequency of the PEL recording signals is at least 500 per inch, and most preferably 722 per inch, both along the record lines and from line to line.

In yet other preferred embodiments a magnification selector is arranged to cause the document drive to move the document at a rate related by the value of the desired magnification to the rate at which the output stock drive moves the output stock.

Other advantages and features of the invention will be apparent from the description and drawings herein of a preferred embodiment thereof.

BRIEF DESCRIPTION OF THE DRAWINGS

FIG. 2 is a schematic diagram of the optical system;

FIG. 3 is another schematic diagram relating to the optical system, showing the separate optical paths of the sharp, unsharp, recording, and grating beams, with beam diameters, focal lengths, and optical path lengths being indicated in accordance with the symbol key at the bottom of that figure;

FIG. 5 is a block diagram of the postamplifier;

FIG. 6 is a block diagram of the exposure control;

FIG. 11 is an idealized diagram showing the pyramidal envelope of the dot reference signals generated by the matrix shown in FIG. 10;

FIG. 12 shows a matrix of PEL reference signals suitable for producing a double resolution screen;

FIG. 14a shows a number of cells on the output copy encompassing an area of sharply changing video levels;

DESCRIPTION OF A PREFERRED EMBODIMENT

Figures 1, 1A:
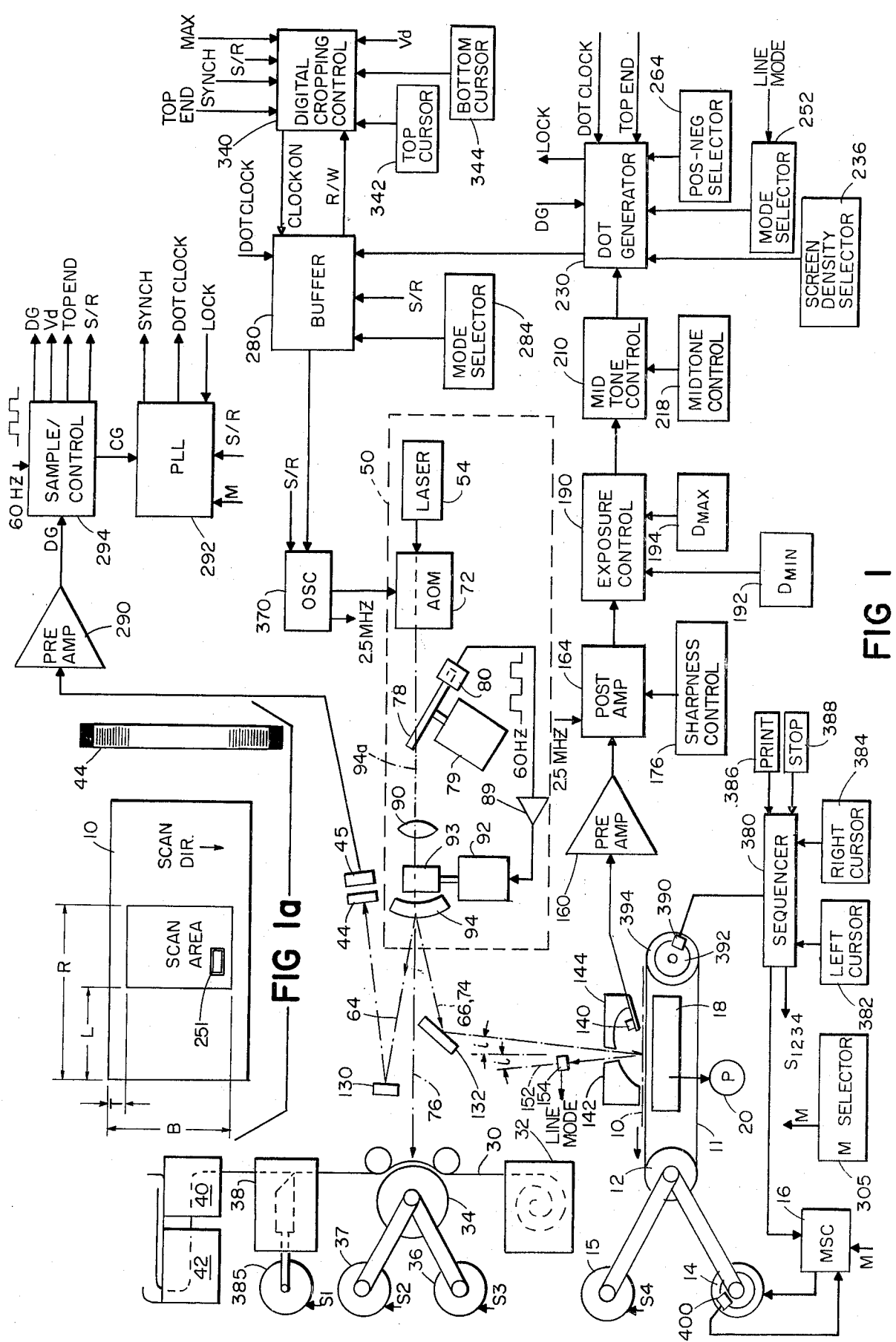
FIG. 1 is a schematic and block diagram of an overall system embodying the invention.
FIG. 1a is a fragmentary diagram showing the original document and the timing grating.

Referring to FIG. 1, the input document 10 to be processed is placed on porous belt 11 driven (right to left in FIG. 1) through drum 12 by either slow motor 14 (the speed of which is controlled by motor speed control 16) or fast motor 15. Plenum 18, kept at sub-atmospheric pressure by pump 20, communicates with the underside of belt 11 to hold the document firmly in place.

Output stock 30 (e.g., dry silver photosensitive paper) is stored in a continuous roll in light tight cassette 32, passes over capstan 34, driven by slow motor 36 or fast motor 37, to be exposed, and then passes through suitable cutoff, storage, and processing units 38, 40 and 42.

Figure 4:
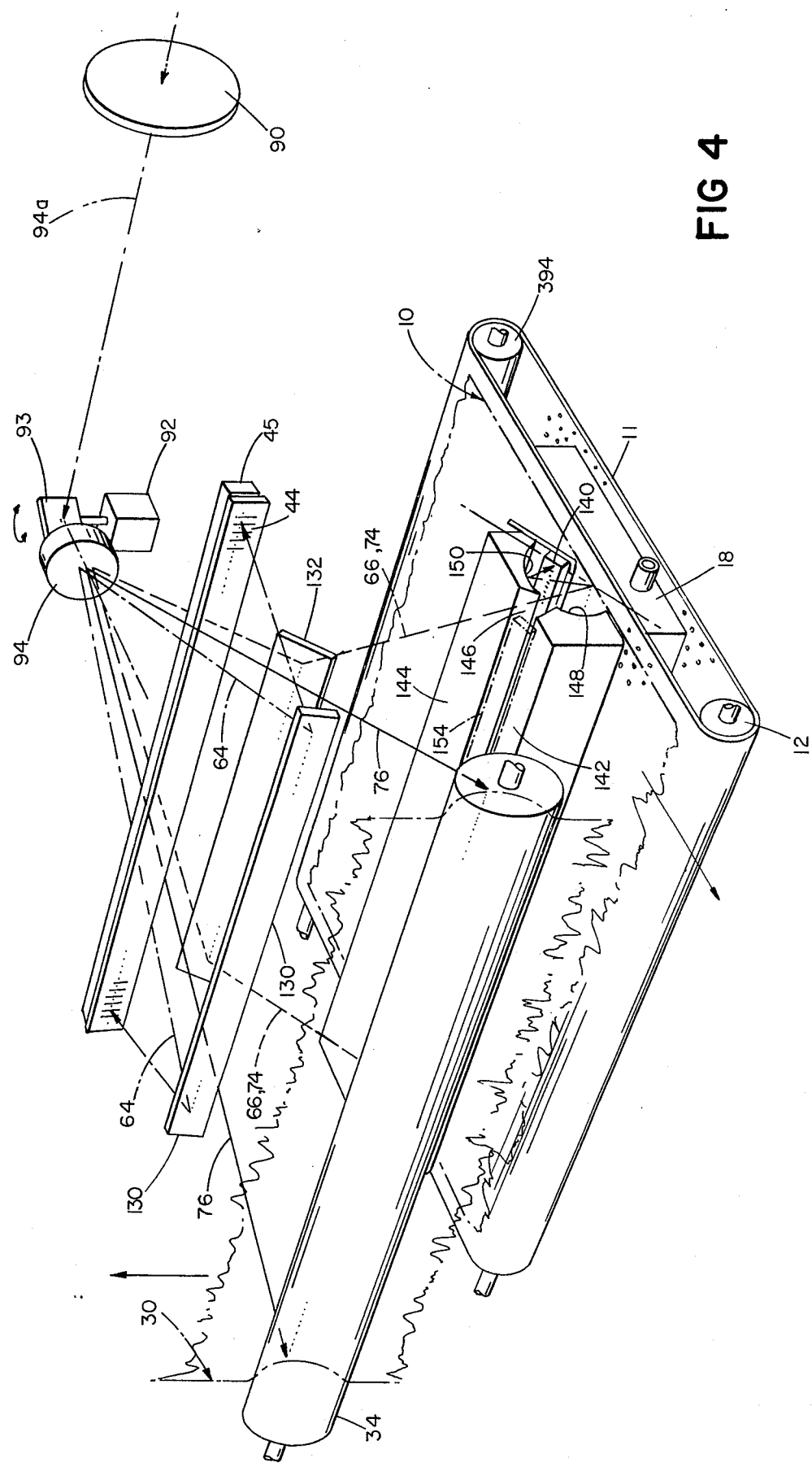
FIG. 4 is a semi-schematic diagram showing the galvo mirror, the original document and the output stock, and the optics therebetween.

Laser beams for scanning (with both sharp and unsharp beams to make possible unsharp masking) the document 10, recording by exposing stock 30, and generating a timing signal in cooperation with a grating 44 and photodiode strip 45, are generated and controlled in optical system 50 (FIG. 2). The output beam 52 of Helium-Neon laser 54 is split by beam splitter 56 into beams 58 and 60. Beam splitter 62 further subdivides beam 60 into grating beam 64 and sharp scanning beam 66. Beam 58, after reflection from 45° mirror 68 and passage through lens 70, enters acousto-optical modulator 72 (e.g., Isomet (Oakland, California) Model 1205), which during a scanning cycle (to be described in detail) provides an output modulated at 2.5 MHz to serve as unsharp scanning beam 74, and during a recording cycle provides a video modulated output to serve as recording beam 76. Rotating shutter 78, driven at 60 Hz by line current operated motor 79, has a transparent sector corresponding to the recording cycle, which allows direct passage of the modulator output as beam 76, and a reflective sector corresponding to the scanning cycle, which acts as a 45° mirror to reflect the modulator output as beam 74. A photo-electric sensing assembly 80, consisting of a light-emitting diode and a photodiode arranged on opposite sides of the shutter, senses shutter position to generate a 60 Hz square wave which is filtered and amplified at 89 for use in driving the scanning galvanometer 92 (FIGS. 1, 4) and synchronizing the rest of the system to the scanning and recording cycles.

The arrangement of lenses and mirrors shown in FIGS. 2 and 3 serves to bring all four beams through lens 90 to a single deflecting galvo mirror 93, from which the four sweeping beams are reflected through objective lens 94. In FIG. 2 the beam centerline positions (in inches) are indicated at various points relative to a horizontal reference plane which includes the axis 94a of lens 90. In FIG. 3 the four beams and the lenses they pass through are shown separately, and beam diameters, lens focal lengths, and optical path lengths are indicated (in mm.). Recording beam 76 has the most direct path of the four beams, and remains in the reference plane throughout to emerge on axis from lens 94. It is reflected by mirror 96, passes through lens 98 to lens 90. Unsharp and sharp scanning beams 74 and 66 are respectively reflected by mirrors 100 and 102 to respectively approach the reflective and back sides of 45° mirror 104 along perpendicular (to each other) axes 106 and 108. Mirror 104 has a 0.010 inch diameter hole 104a coaxial with axis 108 in which the sharp beam 66 is brought to focus by lens 110. Unsharp beam 74 is expanded by lenses 112 and 114 to about 5 mm. diameter at mirror 104, where it is combined with the sharp beam. The two scanning beams are then reflected by mirror 116, pass through lens 118, and are reflected by mirror 120 (located above beam 76 and the reference plane) into lens 90, and ultimately emerge from lens 94 (FIG. 4) slightly below the reference plane. Grating beam 64, after reflection from mirror 122, passes through lens 124 and is reflected by mirror 126 (located below beam 76 and the reference plane) to lens 90, and ultimately emerges from lens 94 slightly above the reference plane.

Deflection of mirror 93 is to and fro, with the forward stroke occurring during the scanning cycle and the reverse stroke during the recording cycle. The recording beam, present only during the reverse stroke, falls directly upon output stock 30 as it passes over capstan 34. The grating beam, used on both strokes, is reflected by mirror 130 onto grating 44 and through it to photodiode strip 45. The scanning beams, used only on the forward stroke (although beam 66 is harmlessly present on the reverse stroke), are reflected by mirror 132 to input document 10.

The sharp scanning beam has a spot size at the document being scanned of about 0.0015 inch, and the unsharp beam a corresponding spot size of about 0.075 inch. To get the desired small scanning spot, lens 94 should be at $f/32$ ($f$/number being used here as the ratio of the distance between lens 94 and the surface being scanned to the diameter of the beam at the lens) or less, which in turn necessitates a beam diameter at lens 94 of at least ½ inch in the present embodiment. Furthermore, in order to effectively isolate the modulated output beam emerging from modulator 72, the $f$/number of the beam through modulator should exceed the reciprocal of the angular separation of the direct and diffracted beams (0.007 radians for glass and 0.014 radians for $PbMoO_3$, respectively, for 633 mm. wavelength light, calling for at least $f/140$ and $f/70$, respectively). At the same time, the $f$/number should not be so high as to unnecessarily restrict the modulator bandwidth, which is inversely proportional to optical beam diameter, which in turn grows with $f$/number. The parameters indicated in FIGS. 2 and 3 were selected with these constraints in mind. In particular, with a 1 mm. beam from laser 54, the 152 mm. focal length of lens 70 gives $f/152$ for the beam through the modulator, which gives satisfactory results for both glass and $PbMoO_3$.

As the sharp and unsharp scanning beams transverse document 10, light which is diffusely reflected from the document is collected by photodiode strip 140, aided by special mirrors 142 and 144. These mirrors are separated by a gap 146 wide enough to admit the scanning beams, and have reflective surfaces 148 and 150 which are elliptical in cross-section (i.e., the reflective surfaces are generated by a straight line moving along the perimeter of an ellipse). Photodiode strip 140 and the intersection of the scanning beams with the plane of document 10 are located respectively at the two foci of the elliptical-cylindrical surface on which the mirror surfaces lie, so that a large proportion of the light diffusely reflected by the document to the mirrors is reflected to the photodiode strip, increasing efficiency and uniformity. In order to avoid pickup by photodiode strip 140 of light which is specularly reflected from the document (i.e., due to its intrinsic shiny surface, irrespective of the information appearing thereon), the scanning beams are incident on the document at a slight angle i (e.g., 2.5°) to the normal to its surface, causing the specularly reflected beam 152 to leave at an equal angle i to that normal. Gap 146 is wide enough to pass all of beam 152. A second photodiode strip 154 may be mounted in gap 146 for a purpose to be described.

The output of photodiode strip 140 is converted to video in preamplifier 160.

Postamplifier 164 (FIG. 5) separates the sharp and unsharp video signals using a double tuned circuit centered at 2.5 MHz. In demodulator and filter circuitry 168 the unsharp signal is demodulated by multiplying it by a 2.5 MHz square wave, and is filtered to the desired 70 KHz bandwidth. In filter circuitry 166 the sharp signal is isolated. The unsharp signal is subtracted from the sharp by circuitry 172. In circuitry 174 a percentage of the difference signal, selected by adjusting sharpness control 176, is added to the sharp video to enhance image sharpness without changing contrast or brightness. (Extensive discussion of the general theory and techniques of unsharp masking appears in Yule U.S. Pat. Nos. 2,455,849 and 2,691,696.)

Exposure control 190 (FIG. 6) accepts the sharpened video in the range 0 (black) to 2.5 V (white) and converts it to the desired operating range (here ±10 V). Adjustable $D_{min}$ control 192 generates a selected light tone reference voltage (e.g., 2.4 V), and adjustable $D_{max}$ control 194 generates a selected dark tone reference voltage (e.g., 0.10 V). Circuit 190 then causes video at the light tone reference voltage to go to $-10$ V and video at the dark tone reference voltage to go to $+10$ V. Eventually $D_{min}$ and $D_{max}$ correspond to particular dot sizes (e.g., 5% and 95%) on the halftone output copy.

To provide the necessary $-20\ [D_{min} - D_{max}]$ gain and $(D_{min} + D_{max}/2)$ level shift of the sharpened video ($V_s$), the selected $D_{min}$ and $D_{max}$ voltages are subtracted and added by circuits 196 and 198, respectively, and an output equal to $$\frac{20\left[V_s - \frac{(D_{min} + D_{max})}{2}\right]}{D_{min} - D_{max}}$$

is produced by circuit 200.

Figure 7:
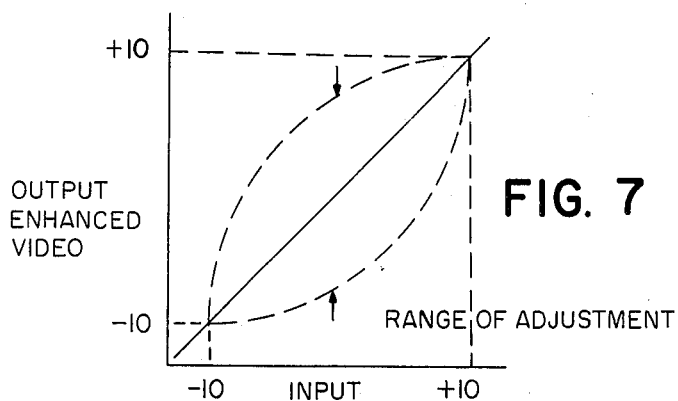
FIG. 7 is a graph showing the range of adjustment permitted by the midtone control.
Figure 8:
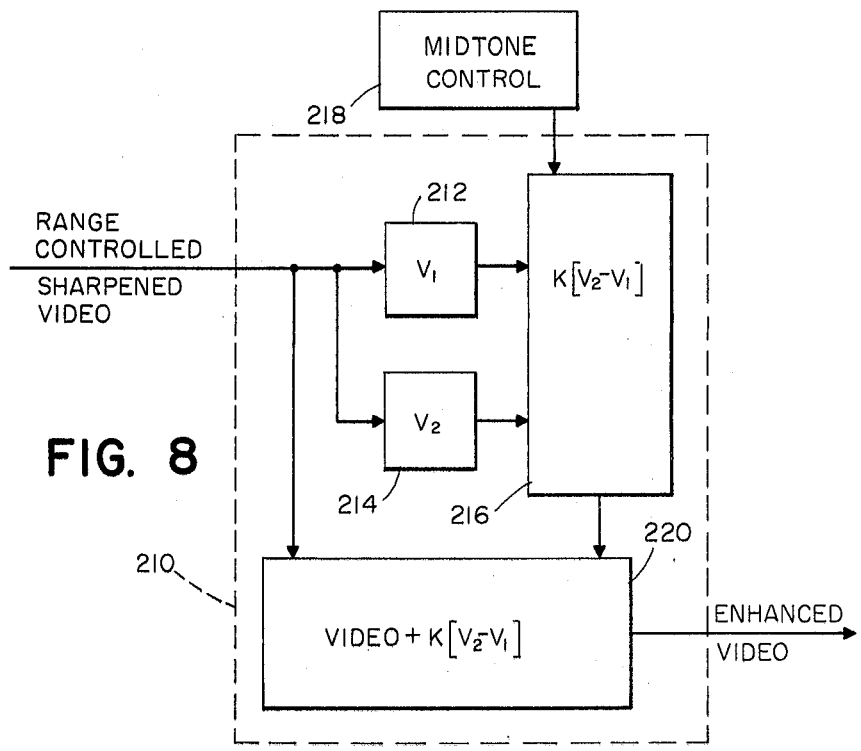
FIG 8 is a block diagram of the midtone control circuit.
Figure 9:
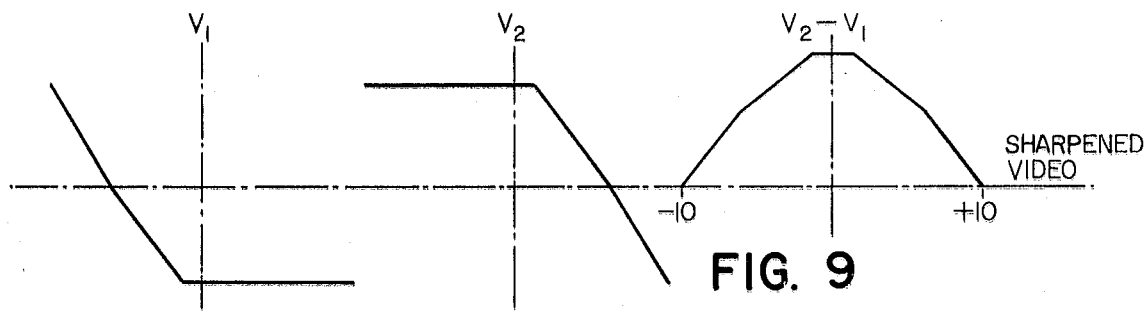
FIG. 9 is a set of graphs showing the approximately parabolic function used in the midtone control circuit.

Midtone control 210 (FIGS. 7-9) makes possible a selected brightness increase or decrease in the midtones without affecting the selected $D_{min}$ and $D_{max}$, by adding to the incoming sharpened video a piecewise-linear approximation of a parabolic waveform. Voltages $V_1$ and $V_2$ are generated by circuits 212 and 214 as respective functions of the sharpened video (the functions being shown graphically in FIG. 9). In circuit 216 the difference $V_2 - V_1$ is multiplied by a DC voltage K, the amplitude and polarity of which are selected by adjusting control 218 which generates K, thus determining the amplitude and polarity of the parabola. The parabolic waveform is then added to the range controlled sharpened video in circuit 220 to produce an enhanced video signal wherein the midtones are darkened or lightened as desired.

Dot generator 230 converts the enhanced video into a series of discrete, digital dot signals which ultimately modulate the recording laser beam to produce the desired halftone. The dot generator stores a dot reference signal consisting of a matrix of digital picture element (PEL) reference signals, and repeatedly compares the enhanced video with the dot reference signal, PEL by PEL, to produce, corresponding to each dot reference signal, a matrix of PEL recording signals which together determine the size and configuration of the halftone dots ultimately printed. The polarity of the dot reference signal is reversed for adjacent dots in the rows and columns of the screening pattern.

Figure 10:
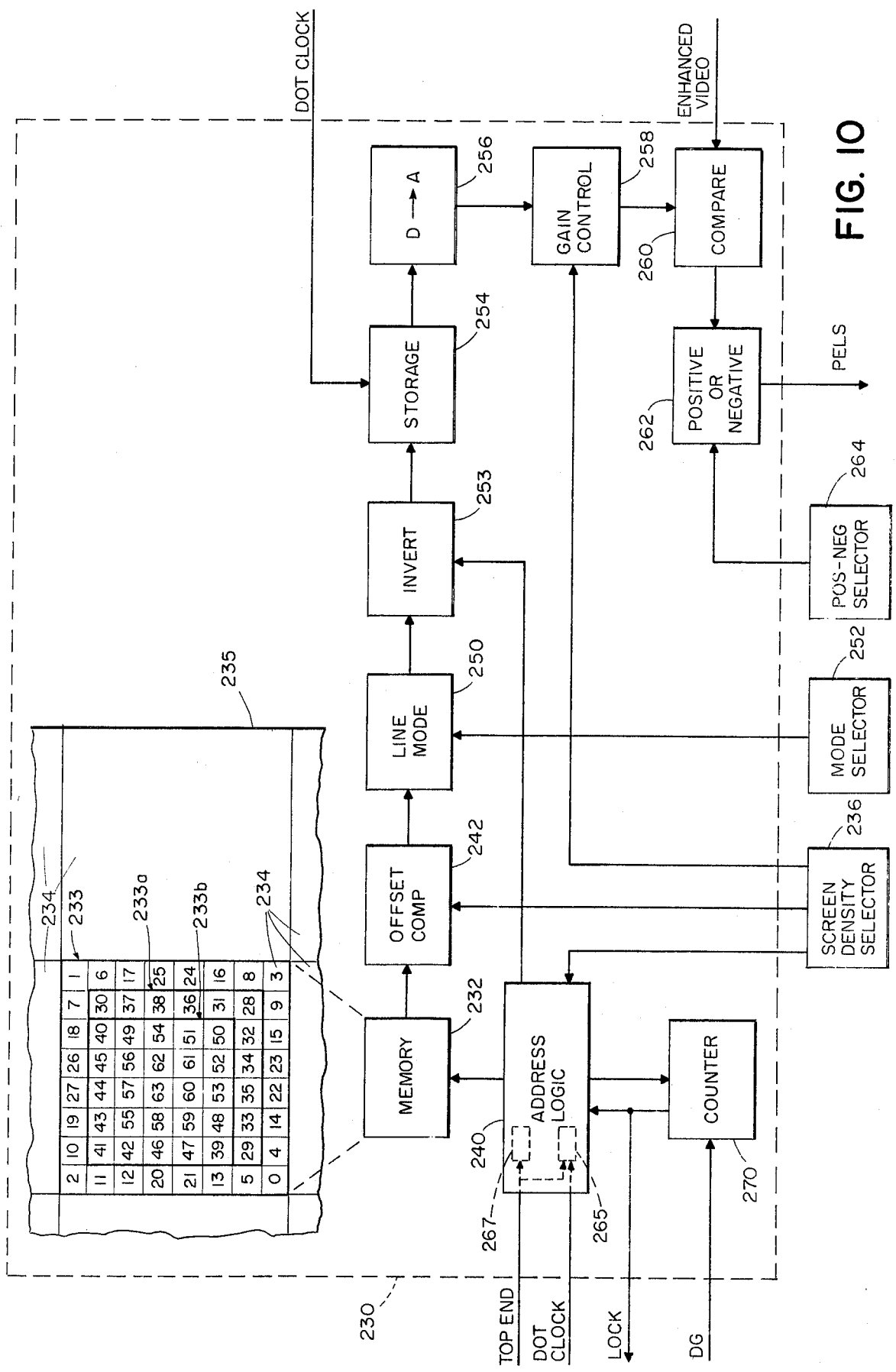
FIG. 10 is a block diagram of the dot generator, with a typical matrix of PEL reference signals shown above the memory.

Referring to FIG. 10, the dot reference signal is stored in a memory register 232 as an 8 × 8 matrix 233 of 8 bit PEL reference words of values 0 through 63, corresponding spatially to a cell 234 of the halftone screening pattern 235. That is, the order in which the matrix values are retrieved for comparison with video samples in such that the spatial arrangement of the matrix over a cell 234 puts each PEL reference signal at the position ultimately printed black or white by the PEL recording signal produced by the comparison with video of that particular PEL reference signal. Of course, the video samples used to produce all the PEL recording signals for a given cell can also be considered as being arranged in a matrix over a cell of the original document corresponding to the given cell 234, with the matrix position of the PEL recording signals and the video samples to which they correspond being the same.

The lowest values in matrix 233 are around the edges of the matrix (the edges themselves sloping toward the corners) and the highest values at the center, as shown numerically in FIG. 10. Considering each PEL reference word as representing the amplitude of the dot reference signal at one point on the 8 × 8 square, the matrix envelope has the general shape of a pyramid. Taking into account the polarity reversal for adjacent cells, the dot reference signals over a succession of cells graphically form roughly the surface shown in FIG. 11. Matrix 233 corresponds to a conventional screen, where the 50% gray level dot is slightly "elliptical" as that word is commonly understood in the printing art.

The resolution of the scanning and recording laser beams is 722 lines (or PELs) per inch (subject to a magnification factor to be discussed) along both the x and y axes of the document. The 8 × 8 PEL matrix will produce a halftone having a screen density of 65 lines per inch (LPI, measured on the diagonal). If finer screen density is desired, less than the full matrix can be used to produce each dot; accordingly, screen density selector 236 can be set to 65, 85, or 100 LPI. For 85 LPI the 6 × 6 matrix 233a is used (excluding the edge values of the 8 × 8 matrix), and for 100 LPI the 5 × 5 matrix 233b is used (excluding two edges of the 6 × 6 matrix). Screen density selector 236 provides an input to matrix address logic 240 to coordinate the matrix values employed with the desired screen density. Offset compensation circuitry 242, also connected to density selector 236, subtracts a selected constant from the output of register 232 in the event of 85 or 100 LPI screening, to bring the signal range down to the same baseline used for 65 LPI.

Line mode circuitry 250, under the control of mode selector 252, enables the dot generator to operate in a line mode for reproducing line graphics. In line mode the dot reference signal is converted to a constant zero-valued baseline signal, so that the comparision of that reference signal with the video produces a constant black or white output rather than variable sized dots. If desired, photodiode strip 154 (FIG. 1) may be used to automatically trigger line mode operation by placing narrow (e.g., 0.02 inch wide) highly reflective tape 251 (FIG. 1) on document 10 to outline the area containing line graphics. Then, as the scanning beams pass over tape 251, photodiode strip 154 will sense a sharp increase in the intensity of the specularly reflected light beam 152, and will generate a LINE MODE pulse which is supplied to selector 252 to convert to line mode. The next LINE MODE pulse will occur when the scanning beams leave the line graphic area, and will reset selector 252 to return the circuitry to halftone mode.

Inverter 253, synchronized with address logic 240, inverts the polarity of adjacent dot reference signals.

Each digital word constituting a PEL reference signal is stored in register 154 and then passes to digital-to-analog converter 256 for conversion to an analog voltage. Gain control circuitry 258, also under the control of screen density selector 236, operates in the 85 and 100 LPI modes to expand the signal from converter 256 to the full voltage range of the 65 LPI mode.

Comparator circuitry 260 samples the enhanced video, compares it with the analog PEL reference signal, and generates a black digital PEL recording signal if the video is below the reference signal and a white PEL recording signal otherwise.

Inverting circuitry 262, under the control of positive/negative selector 264, inverts the PEL recording signal if it is desired to produce a halftone negative from a positive original (or the reverse).

DOT CLOCK timing pulse inputs to address logic 240 and storage register 254 determine the rate at which PEL reference signals are supplied to circuitry 260, and hence the rate at which the enhanced video is sampled and PEL recording signals emerge from the dot generator. A TOP END pulse, generated at the beginning of each scanning cycle, is also supplied to address logic 240 to cause that logic to shift from one row of PEL reference signals to the next. The derivation of the DOT CLOCK and TOP END pulses is described below. The address logic includes two scale of eight counters 265 and 267 which respectively receive the DOT CLOCK and TOP END pulses to generate the matrix column and row address signals. The TOP END pulses are also supplied to counter 265 to clear it at the start of each scanning cycle.

Raw digital grating pulses (DG) are supplied to counting circuitry 270 for a purpose to be described.

An advantage of the system is that the dot reference signal can be of any desired form, to produce a wide variety of screening effects.

For example, the 8 × 8 matrix of PEL reference signals shown in FIG. 12 may be used instead of that shown in FIG. 10 to give the effect of a double resolution screen, 130 LPI in the midtone video range (here −55 to +55, in terms of the matrix values) and 130 /√2 LPI (with a 45° rotation of the cell pattern) at the ends of the tonal range (here 57 to 63). The matrix of FIG. 12 is designed for use without polarity reversal for adjacent cells. The underlying concept is the use of a dot reference signal with multiple peaks and valleys of different heights and depths; when the video is in the midtone range, all the peaks in the reference signal are above the video, creating a relatively dense screening pattern. When the video is very high or low only the highest peaks or lowest valleys in the reference signal will exceed the video, creating a coarser screening pattern. The matrix of FIG. 12 has maximum valued peak 270 and valley 272, and more moderately valued peak 274 and valley 276. Both peaks are operative in the midtone range, but only the maximum peak and valley are effectively operative outside the midtones.

Screening patterns of horizontal or vertical stripes can be generated by using only the diagonal elements of the FIG. 10 matrix.

Figure 13:
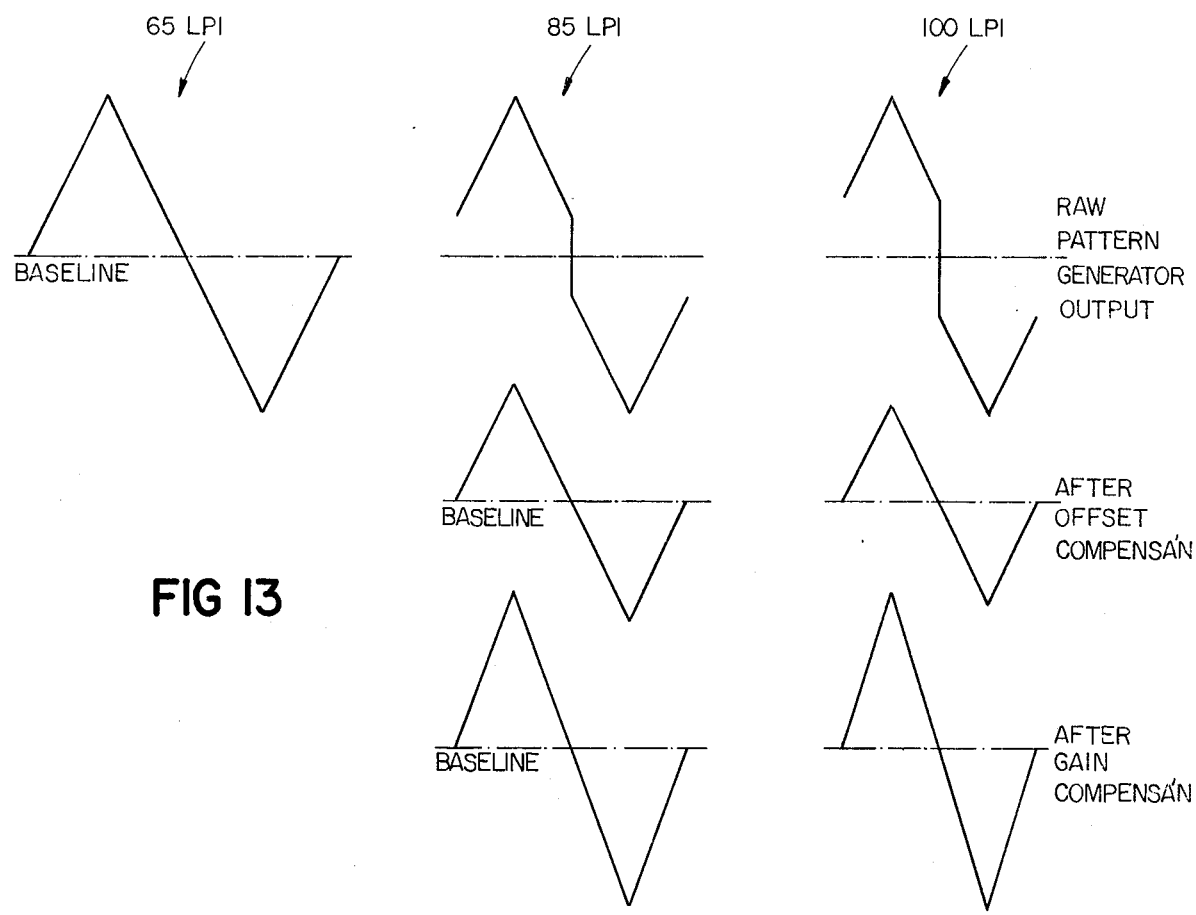
FIG. 13 is a set of graphs showing the idealized envelope of one row of PEL reference signals for three different screen densities, including the effects of offset and gain compensation.

FIG. 13 shows, in analog form, an example of an idealized signal envelope for PEL reference signals for a single row of PELs in two successive dots, for three different screen densities, including examples of offset and gain compensation.

Figure 14:
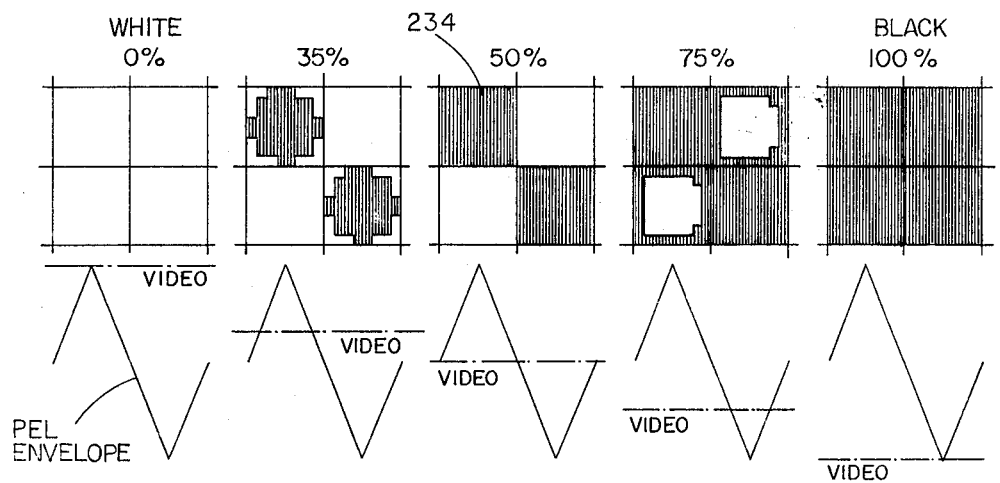
FIG. 14 shows examples of dot patterns in four adjacent screen cells on the output copy for five different constant video levels, with representation of the corresponding video levels superimposed upon one PEL row of the dot reference signal envelope appearing below each dot pattern.

FIG. 14 shows examples of dot patterns in four adjacent cells 234 on the output copy for five different constant video levels with representation of the corresponding video levels superimposed upon one PEL row of the dot reference signal envelope appearing below each dot pattern. At the 50% gray level, e.g., on a single sweep of the beam, the first 8 PEL recording signals are black, the next 8 white, and so on. The same PEL pattern will repeat for the next 7 sweeps, to yield one row of 8 PEL by 8 PEL alternating black and white dots. The next 8 sweeps will generate the same pattern 180° out of the phase with the first row, and so on, ultimately producing a checkerboard. Above 50% gray the white dots grow progressively black, around the edges first. Below 50% the black dots similarly grow progressively white.

FIG. 14a illustrates the ability of the system to reproduce sharply changing video levels even within the area of a single dot cell. This is particularly advantageous where graphics are included along with continuous tone originals. In this case a sharp boundary between a dark and light area runs diagonally from the upper left to the lower right.

The digital PEL recording signals from dot generator 230 are written into storage register buffer 280 during the scanning cycle, and are read out during the recording cycle. Read/write mode cycling is controlled by the S/R logic level input (derivation described below) corresponding to the scan and record cycles. Circuitry is provided in buffer 280, under the control of mode selector 284, to optionally cause readout on a first-in-last-out basis if it is desired to reverse the handedness of the original copy. The DOT CLOCK input controls the PEL read/write rate, and a CLOCK-ON input provides top and bottom margin information (detailed description below) to enable read/write only when the laser beam is sweeping the document area of interest.

Grating 44 is constructed to provide, through photodiode strip 45 and preamplifier 290, 21.6 LPI digital grating pulses (DG) to sample and control circuitry 294, dot generator 230, and, through circuitry 294, to phase lock loop 292.

Figure 15:
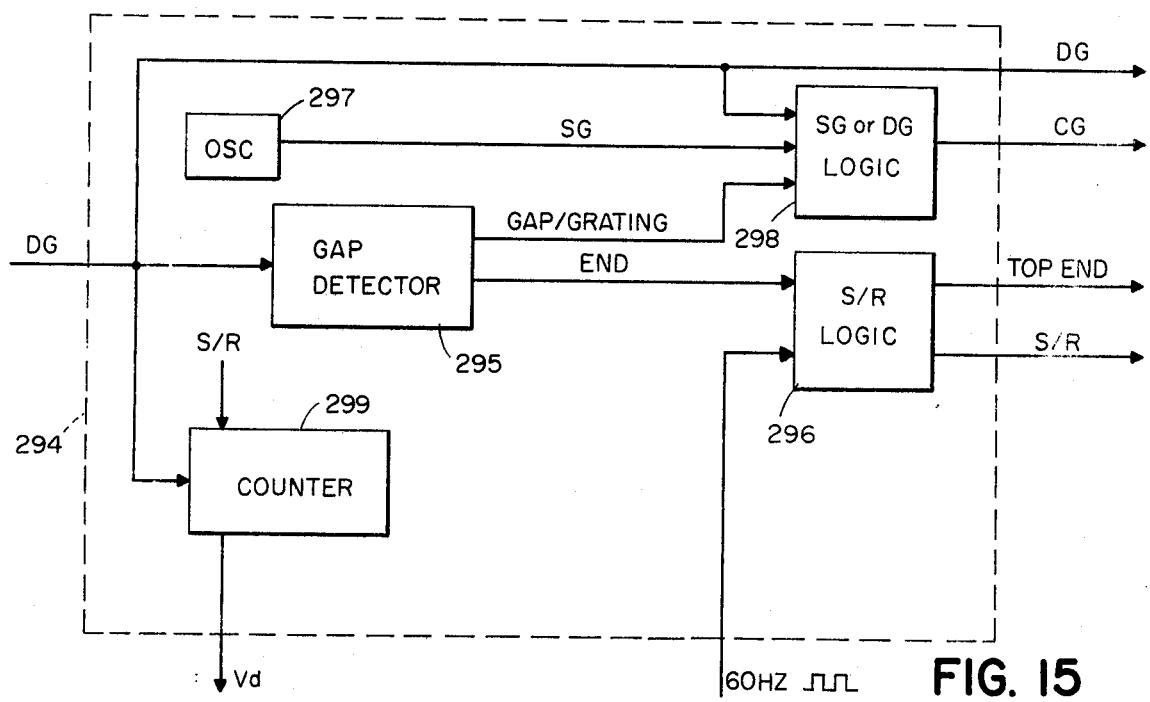
FIG. 15 is a block diagram of the sample and control circuit.

Sample and control circuit 294 (FIG. 15) includes gap detector circuitry 295 which monitors DG to sense gaps in the pulse train which occur when the beam leaves the grating pattern at the end of each scan or record cycle. During each gap an END signal is generated in detector 295 and supplied to S/R logic circuitry 296, which also receives the 60 Hz square wave from shutter sensing assembly 80. Circuitry 296 uses the 60 Hz square wave signal to discriminate between the END signals at the two ends of the grating, and thus generates the S/R logic level synchronized with the END signals, as well as generating the TOP END signal. Oscillator 297 generates a synthetic grating signal SG, which approximates the actual grating signal DG, and is used in the PLL to prevent the loop frequency from wandering while the beam is off the grating. SG, DG, and a GAP/GRATING gate signal from detector 295 are fed to logic circuitry 298, which provides an output CG which is SG while the beam is off the grating and DG while the beam is on the grating. DG and S/R are also fed to counter 299 which counts up during the scan cycle and down during the record cycle to generate a digital signal $V_d$ proportional to the position of the scanning beam along each scan line on the original document.

The grating pattern is 13 inches long, an inch longer than the maximum permissible width of the original and output stock in the scan direction, leaving ½ inch of grating on each side which is traversed by the grating beam while the scan and record beams are off the stock. That ½ inch (about 10 grating lines) is used to give the PLL time to achieve the desired phase lock to the DG signal. The dot generator counting circuitry 270 (FIG. 10) counts the ten grating lines in the first ½ inch of the grating and generates a LOCK signal synchronized with the entrance of the beam onto the surface of the stock. The LOCK signal is provided to addressing logic 240, along with TOP END, so that the PEL reference signals will be generated only while the scanning beam is sweeping the stock during the recording cycle.

Figure 16:
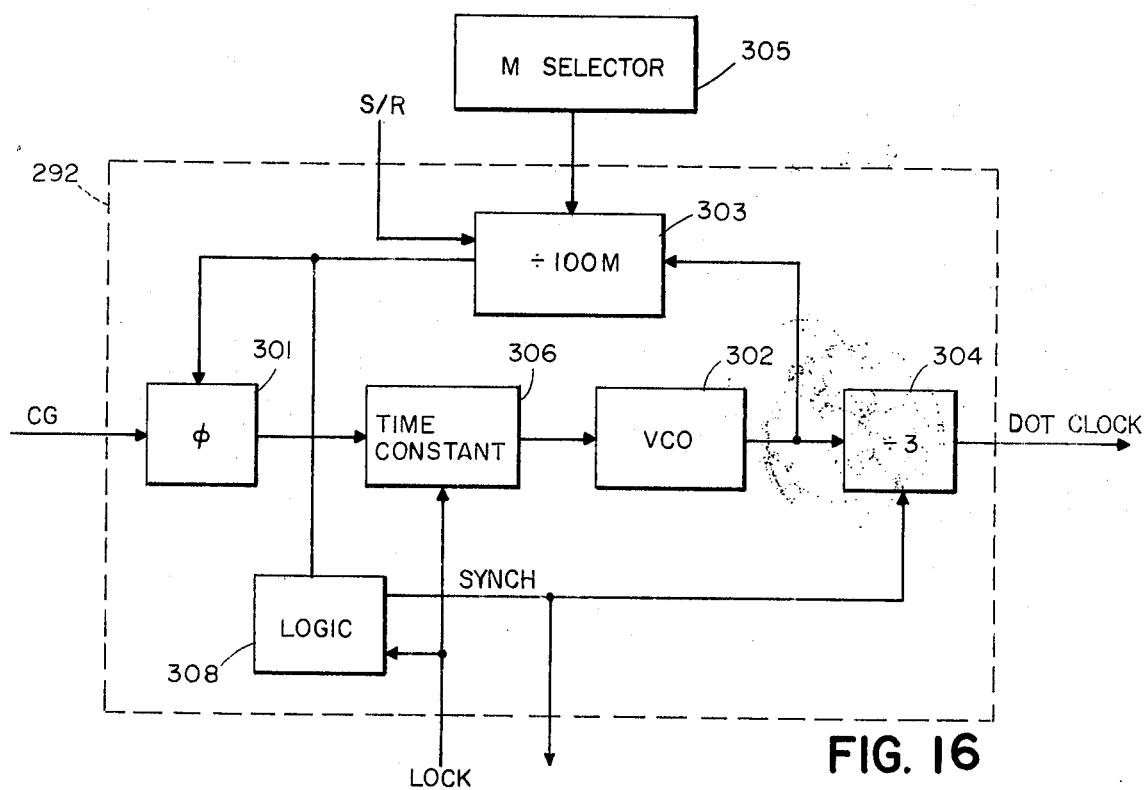
FIG. 16 is a block diagram of the phase lock loop circuit.

The PLL (FIG. 16) includes phase detector circuitry 301 (which receives CG as input) and voltage controlled oscillator (VCO) circuit 302 connected through a feedback loop including a division circuit 303 to cause the oscillator to emit pulses at a rate equal to 100M times the digital grating frequency (100 × M × DG, where M is a selected magnification factor ranging in the present embodiment between 0.20 and 2.00) during the scan cycle and 100 × DG during the record cycle. The VCO output is divided by 3 at 304 to provide the DOT CLOCK output of 722M LPI during the scan cycle and 722 LPI during the record cycle. Magnification (M) is set by adjusting selector 305 and is provided as a digital input to circuit 303. The LOCK signal from the dot generator is provided to PLL time constant circuit 306 to switch the loop from a short time constant (useful to achieve lock quickly) to a long time constant (useful to maintain the stability of the lock). The LOCK signal, along with the output of division circuitry 303, are provided to clock enable logic circuitry 308, which includes flip flops arranged to respond to the first pulse in the feedback loop occurring after LOCK to generate a SYNCH signal, which gates operation of divide by 3 circuit 304 to provide a DOT CLOCK signal. In this way extremely accurate synchronization of DOT CLOCK to the beam scanning is obtained.

Figure 17:
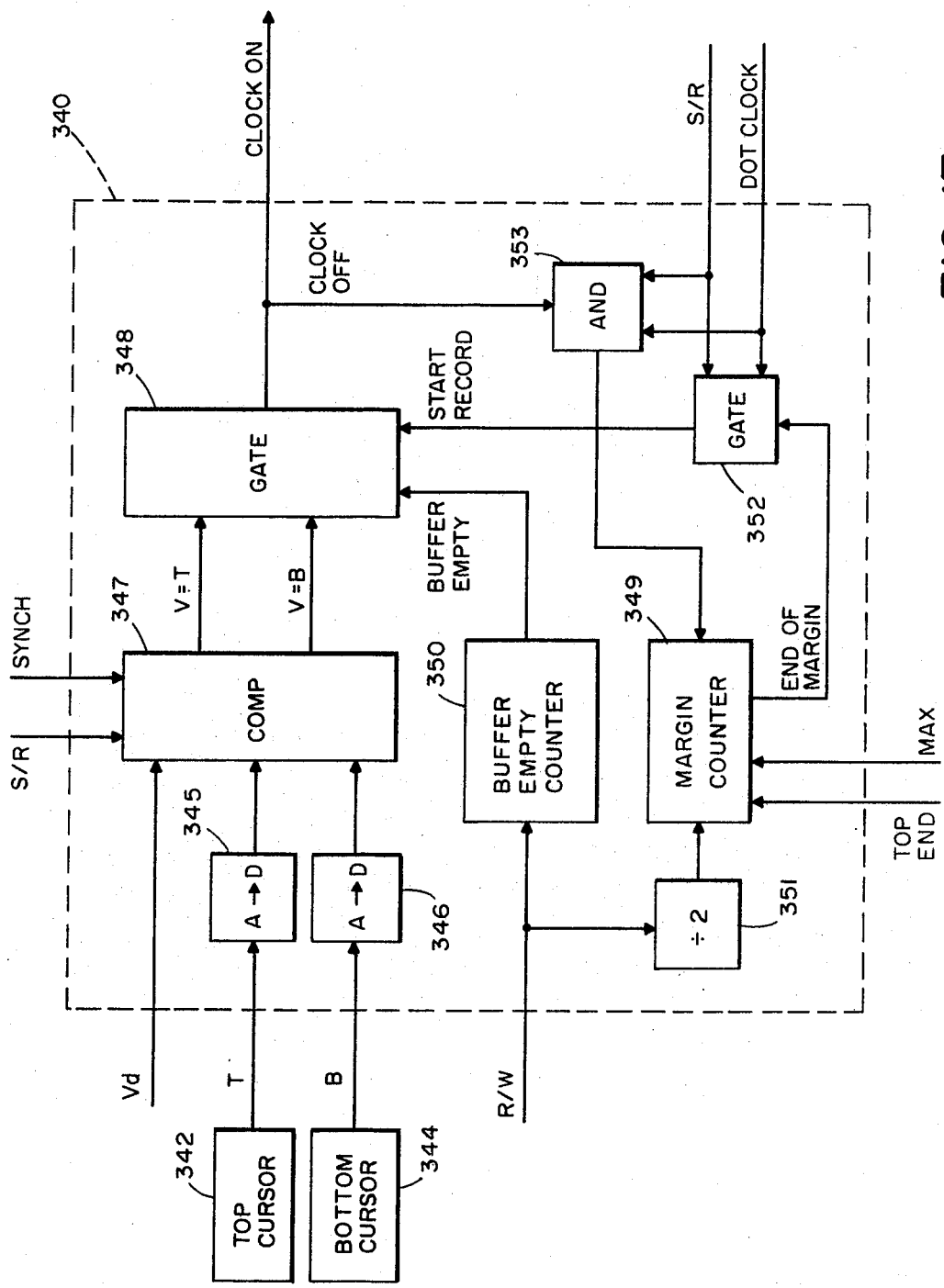
FIG. 17 is a block diagram of the digital cropping control circuit.

Digital cropping and control circuitry 340 (FIG. 17) converts analog T and B signals from adjustable top and bottom cursers 342 and 344 into digital signals corresponding to the top and bottom boundaries of the area on document 10 to be reproduced, using suitable digital to analog converters 345 and 346. Comparator circuitry 347, gated by S/R logic and SYNCH, compares the digitized T and B with $V_d$ during the scan cycle and, through gating circuitry 348, turns on CLOCK ON when $V_d = $ T and turns it off when $V_d = $ B. During the record cycle, counting circuits 349 and 350, incremented and decremented by read/write (R/W) timing pulses from the address logic in buffer 280 which correspond to the reading and writing of PELs out of and into the buffer, serve to distribute the margin space so as to center the recording scan on the output stock. To accomplish that centering, a fixed value MAX, equal to half the capacity of buffer 280 corresponding to the full 12 inch document width, is loaded into counter 349 at each occurrence of TOP END. As each PEL is written into the buffer during the scan cycle counter 350 is incremented by a W pulse, so that at the end of the scan counter 350 will store a value equal to the number of PELs in the buffer. Also during scan, the W pulse rate is divided by 2 in division circuit 351, and the result is used to decrement counter 349 once for every other PEL written into the buffer. At the end of scan counter 349 will then store a value equal to the margin required on each side of the output copy. During the record cycle counter 349 is decremented with DOT CLOCK pulses while CLOCK ON is off (S/R, DOT CLOCK, and CLOCK OFF act through AND gate 353), and when it reaches zero (signalling the end of the margin) an END OF MARGIN signal is supplied to gating circuit 352, which, at the next DOT CLOCK pulse will supply a START RECORD signal to gate 348, turning on CLOCK ON. Then, as the buffer is emptied, the read pulses R decrement counter 350 which at zero generates a BUFFER EMPTY signal to gate 348, turning off CLOCK ON.

The PEL recording signals are fed to oscillator circuitry 370, along with the S/R logic level. During the recording cycle the oscillator circuitry modulates the recording beam on-off in accordance with the PEL signals, and during the scan cycle it provides the 2.5 MHz signal for modulating and then detecting the unsharp scanning beam.

Sequencer 380 receives left and right margin values L and R from the respective cursers 382 and 384, and provides motor signals $S_1$-$S_4$ for starting and stopping cutter motor 385 and motors 37, 36, and 15 at the appropriate times. Motor 14 runs all the time and is selectively overridden by motor 15 by suitable clutching. Inputs from PRINT and STOP controls 386 and 388 start and stop overall operation. Upon receipt of a PRINT command, motor 15 is activated to move document 10 to the beam zone at a fast rate. Cropping in the direction of paper motion is accomplished by comparing L and R with an H signal indicative of the present position of document 10. H is generated by using photodiode sensor assembly 390 to count the marks on a tachometer disk 392 mounted to rotate with drum 394 forming part of the drive for belt 11. When H = L motor 14 moves document 10 at (5"/M) minute until H = R, whereafter motor 15 takes over to flush out document 10 at high speed. When H is between L and R motor 36 moves stock 30 at 5"/minute. After recording exposure is complete motor 37 moves stock 30 rapidly a few inches and then cutter motor 385 is activated.

In motor speed control 16, the output of tachometer assembly 400 coupled to motor 14 is locked (by a suitable phase lock loop) to an oscillator frequency which is divided by 100M to permit speed control in accordance with M.

Conventional circuit design and components are used to implement the system described above. Analog Devices (Norwood, Massachusetts) high speed op-amps (applications of these op-amps and of digital-to-analog converters are described, e.g., in *Analog Devices Product Guide,* 1974) are used throughout the system. Post-amp 164 uses Fairchild μA796 detectors for detecting the sharp and unsharp video (see, e.g., *Fairchild Linear Integrated Circuits Data Catalog,* February, 1973), and a Motorola MC1598L multiplier Exposure control 190 uses Motorola MC1494L and MC1595L multiplier-dividers (applications of which are disclosed, e.g., in *Motorola Linear Integrated Circuits Data Book,* 3rd ed., November, 1973). Midtone control 210 also uses an MC1595L. Dot generator 230 uses a programmable, read-only memory sold by Signetics Corporation, Sunnyvale, California, to store the matrix. Buffer 280 uses a Signetics, Type 2602 static random access memory. Phase lock loop circuitry is described, e.g., in Gardner, *Phase Lock Loop Techniques* (Wiley, 1966).

Other embodiments are within the following claims.

What is claimed is:

1. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black and white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein said dot reference signal source comprises a source of a matrix of digital picture element reference signals of a multiplicity of non-random values which together make up a said dot reference signal, circuitry is provided for converting said digital picture element reference signals to analog signals, and said output circuitry comprises circuitry for comparing successive analog video samples with successive said analog signals in an order such that the positions of said picture element recording signals in the rows and columns of said cell spatially correspond to the respective positions in said matrix of the reference signals which were compared with said video samples to produce said picture element recording signals.

2. The improvement of claim 1 wherein there is provided a storage buffer connected between said output circuitry and said modulator, and said output circuitry includes circuitry for causing said picture element recording signals to be written into said buffer during said scanning cycles and read out of said buffer to said modulator during said recording cycles.

3. The improvement of claim 1 wherein said picture element reference signals are arranged in said matrix with the higher values nearest the center and the lower values nearest the edges.

4. The improvement of claim 1 wherein said means for providing relative motion comprise drives for moving said document and output stock transversely to said scan and record lines, a magnification selector for generating a magnification signal representative of the desired size relationship between said original document and said halftone reproduction transverse to said scan and record lines, said magnification selector being connected to said drives to cause said movement of said document to be at a rate related by the value of said magnification signal to the rate of said movement of said output stock, whereby magnification transverse to said scan and record lines can be controlled independently of magnification along said scan and record lines.

5. The improvement of claim 1 wherein said matrix has eight rows and eight columns with 64 different values of said reference signals.

6. The improvement of claim 1 wherein said dot reference signal source comprises a source of a succession of picture element reference signals of different non-random values, each said dot reference signal comprising a group of said picture element reference signals.

7. The improvement of 1 wherein said matrix has six rows and six columns with 36 different values of said reference signals.

8. The improvement of claim 1 wherein said optical system includes lenses for causing said scanning beam to have a sharply focused portion comprising a sharp scanning beam and a defocused portion comprising an unsharp scanning beam, and a modulator for modulating at least one of said portions at a characteristic frequency to enable separation by said video circuitry of sharp and unsharp components of said electrical output respectively attributable to said sharp and unsharp beams, and said video circuitry comprises unsharp masking circuitry for separating said sharp and unsharp components, subtracting the unsharp from the sharp to produce a difference signal, and adding a selected fraction of said difference signal to said sharp component to provide said video signal with enhanced image sharpness.

9. The improvement of claim 1 wherein said dot reference signal has multiple peaks of different magnitude to form a multiple resolution screening pattern which for video levels above the second highest peak has a cell size larger than that for video levels below the second highest peak.

10. The improvement of claim 1 wherein said means for providing relative motion include means to produce said record lines at a spatial frequency of at least 500 lines per inch.

11. The improvement of claim 10 wherein said frequency is 722 lines per inch.

12. The improvement of claim 1 further comprising a magnification selector for generating a magnification signal representative of the desired size relationship between said original document and said halftone reproduction along said scan and record lines, said magnification selector being connected to said timing circuitry for causing the clock rate during said recording cycles to be related by the value of said magnification signal to the clock rate during said scan cycles, whereby magnification along said scan and record lines can be controlled independently of magnification transverse thereto.

13. The improvement of claim 12 wherein said beam providing means and said means for producing relative motion are arranged so as to produce said record lines at a spatial frequency equal to that of said clock signals during said recording cycles and to produce said scan lines at a spatial frequency equal to that of said clock signals during said scanning cycles.

14. The apparatus of claim 1 wherein said source of light is a laser.

15. The improvement of claim 1 wherein said means for providing relative motion comprise drives for moving said document and said output stock transversely to the direction of said scan and record lines and deflection means for deflecting said beams respectively along said lines.

16. In apparatus for making a halftone reproduction of an original document, comprising
an optical system comprising a source of light and means for providing scanning and recording beams,
means for providing relative motion between the original document and the scanning beam so that the scanning beam will trace a succession of scan lines across the document respectively during a succession of scanning cycles,
an electro-optical pickup operative during each scanning cycle to detect the light from the scanning beam after it has impinged upon the document and to thereby provide an electrical output representative of the tone density (including any variation thereof) of the document along the scan line traced,
video circuitry connected to the pickup for converting said electrical output into a video signal,
a source of a succession of non-random dot reference signals representative of the desired halftone screening pattern,
output circuitry responsive to the reference and video signals to repeatedly compare the reference signals corresponding to the various cells of the halftone screening pattern with successive samples of the video signal and to generate halftone recording signals in accordance with the results of the comparison,
a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said input circuitry is connected to said timing circuitry to compare successive video samples with said dot reference signals during said scanning cycles, at said clock rate, and to generate a black or white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein there is provided a storage buffer connected between said output circuitry and said modulator, and said output circuitry includes circuitry for causing said picture element recording signals to be written into said buffer during said scanning cycles and read out of said buffer to said modultor during said recording cycles, and further comprising scan position monitoring circuitry connected to said optical system to provide a position signal representative of the position of said scanning beam on said scan line during said scanning cycles, adjustable top and bottom cursors for generating margin signals representative of the margins in the direction of scan of the area on said original document to be reproduced, and cropping circuitry connected to said monitoring circuitry, said cursors, and said buffer to enable writing picture element recording signals into said buffer only when said position signal is between said margin signals.

17. The improvement of claim 16 wherein said cropping circuitry comprises circuitry for storing a value representative of the full width of said output stock in the direction of said record lines, for computing during each said scanning cycle the total margin space available for the next record line on said output stock, and for distributing said margin space between the top and bottom margins on said output stock during each said recording cycle.

18. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signals and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black or white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein said output circuitry comprises circuitry for effectively converting said dot reference signals into a constant signal valued at the baseline of said video signal so that comparison of said constant signal with video derived from line graphics portions of said original document will produce constant black or white picture element recording signals, and a line mode selector is provided and connected to said output circuitry to provide thereto a control signal to cause said converting.

19. The improvement of claim 18 further comprising a second electro-optical pickup disposed in the path of light from said scanning beam which is specularly reflected from said document, said second pickup being connected to said mode selector to provide said control signal upon a predetermined increase in the intensity of said specularly reflected light, whereby changes between halftone and line modes can be triggered by highly reflective tape on said document.

20. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black or white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein said dot reference signal source comprises a source of a matrix of picture element reference signals of a multiplicity of non-random values which together make up a said dot reference signal, and said output circuitry comprises circuitry for comparing successive video samples with successive signals in said matrix in an order such that the positions of said picture element recording signals in the rows and columns of said cell spatially correspond to the respective positions in said matrix of the reference signals which were compared with said video samples to produce said picture element recording signals, wherein said output circuitry includes circuitry for limiting the matrix signals used for comparison with said video samples to signals contained in a sub-matrix of said matrix, thereby reducing the number of picture element reference signals constituting each said dot reference signal, to accomodate a corresponding decrease in the cell size of said screening pattern, and a screen density selector is provided and connected to said output circuitry to provide thereto a control signal for determining the size of said sub-matrix.

21. The improvement of claim 20 wherein said output circuitry further comprises circuitry connected to said screen density selector and operative when said limiting circuitry is operative to adjust the signal level range and baseline of the signals in said sub-matrix to the range and baseline of the signals in the full matrix, prior to comparison with said video.

22. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black or white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein said dot reference signal source comprises a source of a matrix of picture element reference signals of a multiplicity of non-random values which together make up a said dot reference signal, and said output circuitry comprises circuitry for comparing successive video samples with successive signals in said matrix in an order such that the positions of said picture element recording signals in the rows and columns of said cell spatially correspond to the respective positions in said matrix of the reference signals which were compared with said video samples to produce said picture element recording signals, wherein said picture element reference signals are arranged in said matrix with a group of highest values clustered to form a first peak in said dot reference signal, a group of next highest values clustered to form a second such peak, a group of lowest values clustered to form a first valley, and a group of next lowest values clustered to form a second valley, said first peak and first valley being respectively of larger magnitude than said second peak and second valley, whereby to form a double resolution screening pattern with a small cell size operative for video levels in a midtone range between said second peak and valley and a large cell size operative for video levels outside said midtone range.

23. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black or white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein said output circuitry comprises circuitry for repeatedly retrieving the same dot reference signal from said source of dot reference signals for use in generating the respective said sets of said recording signals, and for inverting the polarity of said dot reference signal for adjacent said cells in the rows and columns of said screening pattern.

24. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black or white picture element recording signal for each comparison so as to provide to said modulator in each said recording cycle, at said clock rate, a succession of said picture element recording signals for each said cell swept by said recording beam, and said means for providing relative motion includes means for causing said scanning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers and locations of the black and white picture element recording signals making up each said dot, wherein there is provided a storage buffer connected between said output circuitry and said modulator, and said output circuitry includes circuitry for causing said picture element recording signals to be written into said buffer during said scanning cycles and read out of said buffer to said modulator during said recording cycles, and further comprising circuitry in said buffer capable of reading said picture element recording signals out of said buffer in either the same or opposite order in which they were written in, and a mode selector connected to said buffer for providing thereto a contrl signal which determines the direction of readout and hence the handedness of said halftone reproduction.

25. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of non-random dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein timing circuitry is provided for generating clock signals during said scanning and recording cycles at a clock rate sufficiently fast to provide a multiplicity of said clock signals during each time period required for a said beam to sweep across one cell of said screening pattern, said output circuitry is connected to said timing circuitry to compare successive video samples with said dot reference signals during said scanning cycles, at said clock rate, and to generate a black or white picture element recording in each said recording cycle, at said clock rate, a succession of said picture element recording signals for each said cell swept by said recording beam, and said means for providing relative motion includes means for causing said scaning and recording beams to respectively trace a multiplicity of said scan and record lines across each said cell, whereby in each said cell picture element recording signals are recorded on said output stock in sets arranged in multiple rows and columns, so that the size and configuration of said black and white dots are determined by the relative numbers of locations of the black and white picture element recording signals making up each said dot, wherein inverting circuitry is provided for inverting said picture element recording signals when it is desired to make a halftone negative from a positive original, or a halftone positive from a negative original, and a selector for activating said inverting circuitry.

26. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, that improvement wherein said video circuitry comprises range control circuitry for converting said electrical output from said pickup into an intermediate video signal covering a desired signal level range, and midtone control circuitry for adding to said intermediate video signal an enhancement signal which when graphed against said intermediate video forms a piecewise linear approximation of a parabola, whereby said video signal by comparison with said intermediate video signal has its midtone values selectively enhanced.

27. The improvement of claim 26 further comprising a midtone control connected to said midtone control circuitry for determining the amplitude of said enhancement signal.

28. In apparatus for making a halftone reproduction of an original document, comprising an optical system comprising a source of light and means for providing scanning and recording beams, means for providing relative motion between the original document and the scanning beam so that the scaning beam will trace a successiion of scan lines across the document respectively during a succession of scanning cycles, an electro-optical pickup operative during each scanning cycle to detect the light from the scanning beam after it has impinged upon the document and to thereby provide an electrical outout representative of the tone density (including any variation thereof) of the document along the scan line traced, video circuitry connected to the pickup for converting said electrical output into a video signal, a source of a succession of dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, a timing grating, said optical system comprising a source of a grating beam directed to impinge upon said grating and to deflect across said grating in synchronism with the trace of said scanning and recording beams, an electro-optical grating pickup located adjacent said grating to detect light from said grating beam after it has impinged upon said grating to produce a train of electrical grating pulses, and timing circuitry, including a phase lock loop, connected to said grating pickup to generate clock signals at a clock rate locked to the frequency of said grating pulses, said output circuitry being connected to said timing circuitry to compare successive video samples with said dot reference signals to said clock rate during said scanning cycles and to provide said recording signals to said modulator during said recording cycles at said clock rate, that improvement comprising a magnification selector for generating a magnification signal representative of the desired size relationship between said original document and said halftone reproduction, said magnification selector being connected to said phase lock loop to cause said clock rate during said recording cycles to be related by the value of said magnification signal to said clock rate during said scanning cycles.

29. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, said optical system comprising a first lens for focusing light from said source forming said recording beam, a second lens for focusing light from said source forming a sharp scanning beam portion of said scanning beam, and a third lens for defocusing light from said source forming an unsharp scanning beam portion of said scanning beam, said video circuitry including unsharp masking circuitry for using information from said unsharp scanning beam to enhance image sharpness in said video signal, that improvement comprising a shutter assembly for diverting the output of said modulator to said third lens during said scanning cycles to modulate light forming said unsharp scanning beam, and circuitry connected to said modulator to produce modulation of the light passing therethrough at a constant frequency during said scanning cycles and in accordance with said dot recording signals during said recording cycles, said constant frequency modulation enabling separation by said video circuitry of sharp and unsharp components of said electrical output of said pickup respectively corresponding to said sharp and unsharp beams.

30. The improvement of claim 29 further comprising an electro-optical assembly arranged to sense the state of said shutter assembly to generate a train of cycle signals to discriminate between said scanning and recording cycles, and a drive for said deflecting mirror connected to said electro-optical assembly and responsive to said cycle signals to deflect said mirror in one direction during said scanning cycles and in the opposite direction during said recording cycles.

31. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into a video signal, a source of a succession of dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the halftone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, said optical system comprising a first lens for focusing light from said source forming said recording beam, a second lens for focusing light from said source forming a sharp scanning beam portion of said scanning beam, and a third lens for defocusing light from said source forming an unsharp scanning beam portion of said scanning beam, said video circuitry including unsharp masking circuitry for using information from said unsharp scanning beam to enhance image sharpness in said video signal, that improvement comprising a fourth lens for focusing light from said source forming a grating beam, a grating arranged to intercept said grating beam, an electro-optical grating pickup arranged to receive light from said grating beam after it impinges upon said grating to provide a train of grating pulses, said output circuitry being connected to said grating pickup to generate a train of clock pulses based upon said grating pulses, said output circuitry being connected to said timing circuitry to time comparisons of said clock pulses during said scanning cycles and to time delivery of said recording signals to said modulator at the rate of said clock pulses during said recording cycles.

32. The improvement of claim 31 wherein a deflecting mirror is provided to simultaneously deflect said recording, sharp scanning, unsharp scanning, and grating beams.

33. In apparatus for making a halftone reproduction of an original document, comprising an optical system comprising a source of light and means for providing scanning and recording beams, means for providing relative motion between the original document and the scanning beam so that the scanning beam will trace a succession of scan lines across the document respectively during a succession of scanning cycles, an electro-optical pickup operative during each scanning cycle to detect the light from the scanning beam after it has impinged upon the document and to thereby provide an electrical output representative of the tone density (including any variation thereof) of the document along the scan line traced, video circuitry connected to the pickup for converting said electrical output into the video signal, a source of a succession of dot reference signals representative of the desired halftone screening pattern, output circuitry responsive to the reference and video signals to repeatedly compare the reference signals corresponding to the various cells of the halftone screening pattern with successive samples of the video signal and to generate halftone recording signals in accordance with the results of the comparison, a modulator in said optical system responsive to the output circuitry and operative during a succession of recording cycles to modulate the recording beam in accordance with the half-tone recording signals, and means for providing relative motion between photosensitive output stock and the modulated recording beam so that the recording beam will trace a succession of record lines across the output stock respectively during said succession of recording cycles to record black and white dots in the cells of said halftone screening pattern, said optical system comprising a first lens for focusing light from said source forming said recording beam, a second lens for focusing light from said source forming a sharp scanning beam portion of said scanning beam, and a third lens for defocusing light from said source forming an unsharp scanning beam portion of said scanning beam, said video circuitry including unsharp masking circuitry for using information from said unsharp scanning beam to enhance image sharpness in said video signal, that improvement wherein said second and third lenses have optical axes perpendicular to each other, and a mirror is arranged at 45° to said axes at their intersection, said mirror having a non-reflective side facing said second lens, a transparent window to permit passage through said mirror of light forming said sharp scanning beam, and a reflective side facing said third lens to reflect light forming said unsharp scanning beam to a path coaxial with said light forming said sharp scanning beam.

* * * * *

UNITED STATES PATENT AND TRADEMARK OFFICE
CERTIFICATE OF CORRECTION

PATENT NO. : 4,080,634
DATED : March 21, 1978
INVENTOR(S) : William F. Schreiber It is certified that error appears in the above-identified patent and that said Letters Patent are hereby corrected as shown below:

col. 2, line 37, "o" should be --of-- col. 3, line 37, "te" should be --the-- col. 3, line 44, after "unsharp" insert --scanning-- col. 3, line 45, "or" should be --for-- col. 4, line 17, "or" should be --for-- col. 4, line 39, "specular" should be --specularly-- col. 7, line 25, after "through" insert --the-- col. 9, line 3, "in" should be --is-- col. 10, line 2, "154" should be --254-- col. 13, line 54, "MC1598L" should be --MC1595L-- col. 14, line 51, "black and white" should be --black or white-- col. 17, line 18, "input" should be --output-- col. 24, line 36 "contrl" should be --control-- col. 25, line 22, after "recording" insert --signal for each comparison so as to provide to said modulator-- col. 26, line 38, "successiion" should be --succession-- col. 27, line 19, "to said clock rate" should be --at said clock rate--

UNITED STATES PATENT AND TRADEMARK OFFICE
CERTIFICATE OF CORRECTION

PATENT NO. : 4,080,634

DATED : March 21, 1978

INVENTOR(S) : William F. Schreiber

It is certified that error appears in the above-identified patent and that said Letters Patent are hereby corrected as shown below:

col. 30, line 5, "the" should be --a--

Signed and Sealed this

Fifteenth Day of August 1978

[SEAL]

Attest:

RUTH C. MASON
*Attesting Officer*

DONALD W. BANNER
*Commissioner of Patents and Trademarks*